United States Patent [19]

Schnitzer

[11] 4,203,558
[45] May 20, 1980

[54] CEREAL MILL

[76] Inventor: Johann G. Schnitzer, Feldbergstr. 26, 7742 St. Georgen, Fed. Rep. of Germany

[21] Appl. No.: 895,713

[22] Filed: Apr. 12, 1978

[30] Foreign Application Priority Data

Apr. 13, 1977 [DE] Fed. Rep. of Germany ....... 2716253

[51] Int. Cl.$^2$ .............................................. B02C 7/18
[52] U.S. Cl. .................................. 241/247; 241/248; 241/259.1; 241/261.1
[58] Field of Search ............ 241/244, 245, 248, 259.1, 241/259.3, 6, 261, 261.1, 261.3, 246, 247, 101.1, 101 R, 249

[56] References Cited

U.S. PATENT DOCUMENTS

| | | | |
|---|---|---|---|
| 3,952,958 | 4/1976 | Rich | 241/261.1 X |
| 4,037,798 | 7/1977 | Schnitzer | 241/246 X |
| 4,082,234 | 4/1978 | Hoffman | 241/261.3 X |

FOREIGN PATENT DOCUMENTS 476615  8/1951  Canada ..................................... 241/246

Primary Examiner—Mark Rosenbaum
Attorney, Agent, or Firm—Lackenbach, Lilling & Siegel

[57] ABSTRACT

A household cereal mill is constructed wth the axis of symmetry of coaxial stationary and rotatable millstones in a horizontal alignment. The driveshaft for the rotating millstone passes through the center of the stationary millstone, and the bearing bushings supporting the driveshaft are inserted into the fixed or stationary millstone. Grain is fed into the conically expanding milling gap between the millstones from above, through a supply channel passing through the matrix of the stationary millstone at a location above the intersection of the apex of the milling gap cone and the centerline of the driveshaft. A spiral spring is employed as a conveyor worm for feed kernels, and is affixed on the outer surface of the driveshaft in a position underlying the supply passage. The milling gap is made adjustable by an adjusting nut screwed onto the outer end of the cantilevered driveshaft segment supporting the rotating millstone, which is slideably positioned on the driveshaft, and keyed thereto for rotational engagement. The end of the driveshaft protruding from the stationary millstone may be adapted for manual drive, to engage the output shaft of a kitchen utensil drive machine, or may be adapted for drive, directly or through a transmission, by an electric motor forming an integral part of the mill assembly.

13 Claims, 2 Drawing Figures

CEREAL MILL

BACKGROUND OF THE INVENTION

The invention relates to grain milling apparatus for household use; it relates, more particularly, to such apparatus provided with rotating and stationary millstones arranged with a horizontal centerline and with a driveshaft which passes through the stationary millstone coaxially with the centerline, with the rotating millstone secured to the driveshaft in a manner preventing relative rotation therebetween, and with a supply funnel communicating with a milling gap formed between the two millstones.

Household grain mills are known in varied forms. Some of the grain mills of the prior art are provided with a handcrank for actuation, some incorporate an electric motor drive, and some are designed as accessory items for coupling to kitchen machine drives.

All of these known forms of household grain mills feature a stationery millstone located within a housing secured to the housing of the drive device. Preferentially the stationary millstone is formed by casting into such housing, and the housing also supports the supply funnel for the grain to be milled. The grain kernels pass from the supply funnel into the milling gap through a central orifice in the fixed millstone and are transported therethrough by a conveyor worm formed on the outside of a driveshaft passing through the central orifice.

The manufacture of such grain mills of the prior art is, consequently, relatively complicated and expensive and, furthermore, the axial extent of the milling apparatus is increased because of the need for coaxial conveying of the grain.

The primary object of the invention is to improve the construction of the household cereal mills of the prior art, as recited hereinabove, so that the manufacture of it is simplified and made more economical, with a reduction in the required number of constructional components, and, in particular, to reduce the axial dimension, so as to obtain a compact milling apparatus.

SUMMARY OF THE INVENTION

The above object is attained, in accord with the teachings of the invention, through the utilization of the stationary millstone as the external housing for the milling apparatus, through the provision of bearing means within the stationary millstone for the driveshaft, and through the placement of the supply funnel atop the stationary millstone and the provision of a substantially radial transfer channel within the stationary millstone interconnecting the supply funnel and the milling gap.

In contrast to the cereal mills of the prior art, the milling apparatus of the invention no longer requires an external housing for the stationary millstone. The housing may be dispensed with since the grain is no longer channelled coaxially through the stationary millstone to the milling gap, but radially therethrough from above. This allows the provision of bearings for the driveshaft within the fixed millstone, a function which had to be assigned to the housing structure previously. The omission of the external housing from the mill assembly reduces the material and manufacturing costs substantially.

The supply of the grain kernels through a vertical channel, formed in the stationary millstone, has the additional advantage that the axial extent of the entire milling apparatus can be materially reduced. The length of the milling assembly, which in the apparatus of the invention encompasses the supply means for grain as well, is essentially defined by the axial dimensions of the two millstones only.

The manufacture of millstones formed in accord with the teachings herein is readily undertaken by casting into suitable forms or molds.

The milling apparatus is suitably affixed to the drive means through the provision of a coupling flange in that face of the stationary millstone which is distant from the rotating millstone. In one embodiment thereof, the milling apparatus of the invention is constructed as an accessory to a conventional kitchen machine. In this embodiment, the aforementioned coupling flange is provided with suitable engagement members to secure the cereal mill to the kitchen machine drive, and the driveshaft is dimensioned and formed to engage with the shaft of the kitchen machine. The form and dimensions of the coupling flange and of the driveshaft are adapted to the specific model of kitchen machine it is to serve as an accessory.

Should the milling apparatus of the invention be utilized as a self-contained unit with its own electric drive motor, the coupling flange is affixed to the housing of the motor and the driveshaft is interconnected with the motor shaft through a suitable gearbox. In a preferred mode of such construction the electric motor is mounted with its rotational axis vertical and the motor casing serves as the support column of the milling assembly. In this manner particularly compact external dimensions may be attained. The drive transmission can, for example, be taken through a worm on the motorshaft mating with a wormgear mounted on the driveshaft of the cereal mill.

The cereal mill of the invention may also be fitted with a manual drive. In this case the coupling flange is simply affixed to a vertical stand, and a handcrank installed on the driveshaft.

In a preferred embodiment of the invention the millstones are provided with conical milling surfaces, with the active milling surface of the fixed millstone expanding in the form of a funnel; the supply channel for grain passes vertically downward to the driveshaft at a position corresponding to the theoretical apex of the conical surfaces of the millstones.

One of the advantages associated with the conical development of the milling surfaces is that the grinding surface area may be made relatively large without a corresponding increase in the diameter of the millstones. A large grinding surface is necessary and important, in order to avoid damaging heat development in the cereal grains during the milling process. The conical form of the grinding surfaces also allows the channelling of grain through the supply funnel and vertically through the transfer channel into the milling gap, permitting a very simple execution of the transfer channel and ensuring the reliable flow of grain kernels without the danger of developing a jam through compaction.

To obtain long-lived, friction-free, unlubricated bearing support within the fixed millstone, the driveshaft is suitably supported in bushings—of sintered metal, plastic or other material—secured in the stationary millstone as inserts during the casting process. These bushings may also be utilized to react to the axial loading developed during milling, if the driveshaft is provided with an external collar bearing against a circumferential face of one of the cast-in bushings.

Since at least two bushings are provided, a very stable support of the driveshaft is ensured. Consequently, a material deflection of the cantilevered rotating millstone is avoided, even in the presence of assymetrical loadings induced by different kernel sizes of the grain in the process of being milled.

In a preferred mode of execution of the invention, the rotating millstone is positioned on the driveshaft in a manner permitting the axial displacement thereof, for the purpose of adjusting the size of the milling gap, and the driveshaft is provided with a threaded portion beyond the rotating millstone. An adjusting nut is placed on the threaded extension of the driveshaft and bears against the outer face of the rotating millstone; it may be locked in place by means of a jamnut. Because of the cantilevered support of the rotating millstone on the driveshaft, there is no relative movement between the adjusting nut and adjacent bearing elements, so that there is no need for friction-reducing means to avoid rubbing and abrasion.

The manufacture of the driveshaft may be simplified through the provision of a central segment, which is located in the bushings within the stationary millstone, into whose ends extension segments for the support of the rotating millstone and for coupling to the drive motor, respectively, may be secured, by threaded connections, for example. Such a segmental construction is particularly advantageous when the cereal mill is designed as a kitchen device accessory, since the segment interconnecting the central portion of the driveshaft with the drive socket of the kitchen machine may be adapted to the specific type and model to which the mill is offerred as an accessory. The other components of the driveshaft are, in contrast, independent of the drive system in design, a circumstance which promotes rational manufacture and production planning.

It is advantageous to provide for assistance in the carrying of the grain from the base of the supply channel into the milling gap, in the form of a spiral spring secured to the intervening section of the driveshaft, in a further development of the mill of the invention. This spiral spring acts in the same manner as a conveyor worm formed on the shaft, at a significantly lower cost and greater simplicity in manufacture.

Since the cereal mill operates, in general, with low rotational speeds, so as to prevent overheating of the milled product in its passage through the abrading region, the resulting flour falls readily downward at the exterior exit of the milling gap, so that it can be conveniently collected in a dish placed under the mill. It is also possible, however, to provide a cap enclosing the rotating millstone and the outer periphery of the milling gap, with a downwardly facing opening in the cap. This would ensure that, even at higher rotational speeds, sidewise discharge and dispersion of the flour is prevented.

BRIEF DESCRIPTION OF THE DRAWINGS

The invention is described, below, with reference to its preferred embodiment illustrated in the enclosed drawing, showing.

DESCRIPTION OF THE PREFERRED EMBODIMENT

Figure 1:
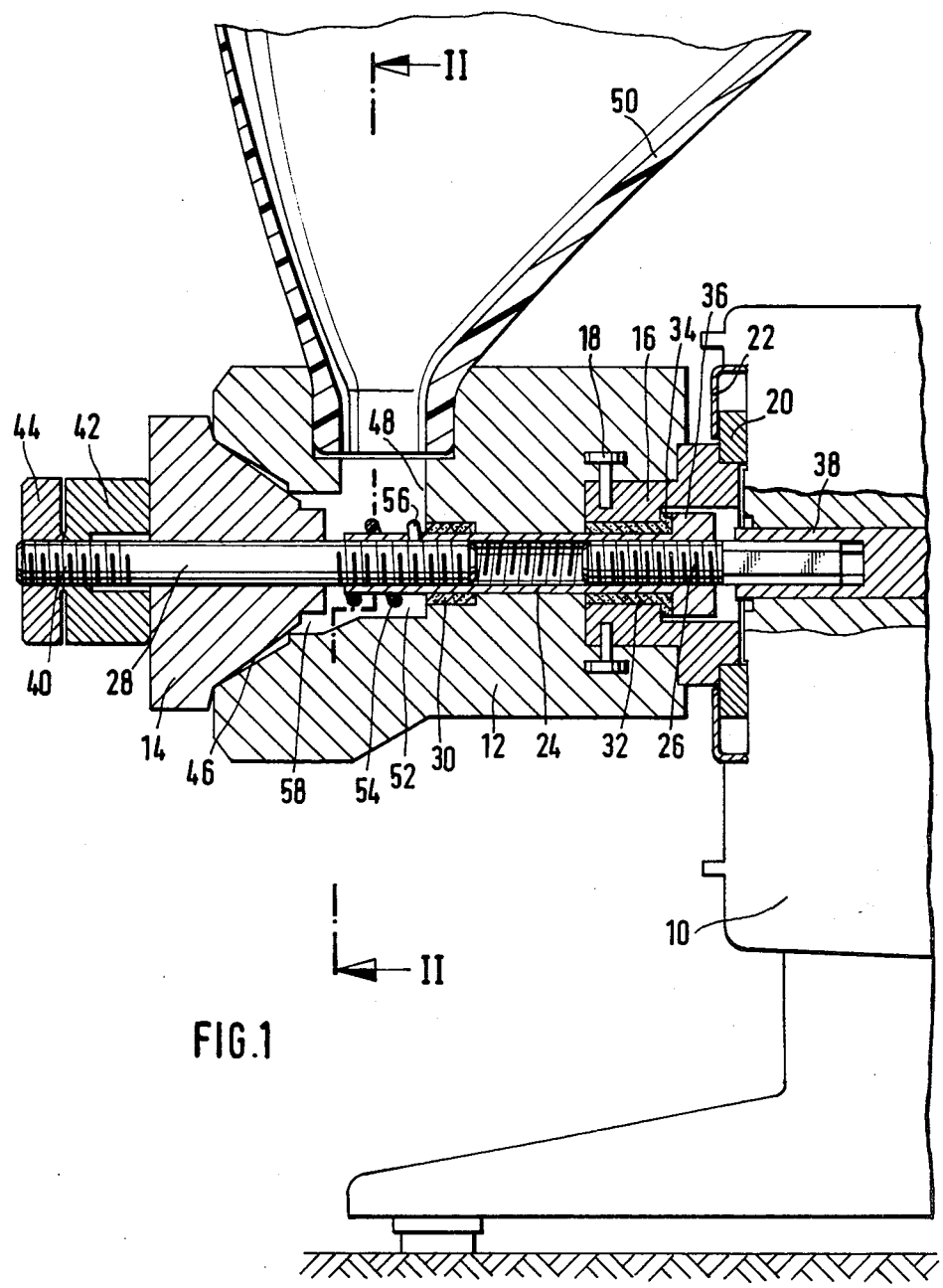
in FIG. 1, an axial section through a household cereal mill constructed in accord with the invention, configured as an accessory to a kitchen machine drive; and in FIG. 2, a lateral section through the embodiment of FIG. 1, taken along section line II—II therein.

The household cereal mill of the invention, shown in the sectioned view of FIG. 1, is configured as an accessory to a conventional kitchen machine 10. The cereal mill proper comprises a stationary millstone 12 and a rotating millstone 14. Both millstones 12 and 14 are cast components of a suitable abrasive material.

A coupling flange 16, constructed of metal or plastic, is cast as an insert into the stationary millstone 12; it is anchored against rotational or axial displacement by radially projecting screws, or pins, 18. A coupler 20 is affixed to the coupling flange 16, and may be constructed integrally with the flange. The coupler 20 is part of a bayonet coupling, with its mating part 22 affixed to the kitchen machine 10; through the engagement of these components the millstone 12 is held to the kitchen machine 10 in a manner prohibiting both rotational and axial displacements.

A driveshaft assembly comprised of segments 24, 26 and 28 is rotatably secured in the fixed millstone 12. The central segment 24 of the driveshaft is supported in two sintered bearing bushings 30 and 32. The bushing 30 is cast into the millstone 12 as an insert, while the bushing 32 is inserted into an appropriate bore through the coupling flange 16 and abuts on the outer face thereof with a radially extending flange 34. In order to react to the axial load developed during milling, the flange 34 is utilized as a thrust bearing against which a collar 36 of the shaft segment 24 bears.

The end of the shaft segment 24 facing the kitchen machine 10 and bearing the collar 36 is provided with a threaded blind bore into which a mating end portion of the shaft segment 26 is engaged. At its outboard end this shaft segment 26 engages, by means of a hexagonal end portion, a corresponding hexagonal socket within the end of a shaft 38 in the kitchen machine 10. In this manner the driveshaft assembly, including segments 24, 26 and 28, is rotatably engaged to be driven by the kitchen machine 10.

The end of the shaft segment 24 furthest from the kitchen machine 10 is also provided with a threaded blind bore. The shaft segment 28 is threaded into this coaxial bore. The segment 28 is provided with a polygonal cross-section upon which the rotating millstone is mounted—by means of a complementary central orifice therethrough—in a manner allowing for axial displacement upon the shaft segment but with no relative angular motion therewith.

An outer section 40 of the shaft segment 28, projecting beyond the outer face of the rotating millstone 14, is provided with an external thread. A nut 42 is engaged upon the threaded portion 40 and abuts the outer face of the millstone 14. The axial distance between the opposing faces of the millstones 12 and 14, defining the milling gap dimension, is adjustable by means of the nut 42. A jamnut 44 is also threaded onto the shaft section 40 and is used to lock the adjusting nut 42 in the desired axial location.

The millstones 12 and 14 are provided with opposing, abrasive, conical surfaces 46. The rotating millstone 14 has the geometric form of a truncated cone, while the abrading surface of the stationary millstone 12 expands in the form of a funnel.

A vertical supply channel 48 passes radially through the millstone 12 and terminates above a portion of the driveshaft segment 24 projecting from the bushing 30.

A supply funnel 50, for the grain to be milled, is set into the upper orifice of the channel 48. It is understood that the funnel 50 can be completely, or at least with a lower portion thereof, cast integrally with the millstone 12. For the sake of reducing the weight of the mill assembly, however, it is preferable that the supply funnel be constructed from a lightweight material, such as plastic.

The supply channel 48 terminates in a chamber 52 surrounding the driveshaft segment 24. The milling gap defined between the opposing faces of millstones 12 and 14 expands concentrically from this chamber 52.

A spiral spring 54 encircles the shaft segment 24 within the chamber 52. An internally bent end portion 56 of the spring is secured in a radial hole drilled into the shaft segment 24, whereby the spring is prevented from moving relative to the shaft segment, both rotationally and axially. The spiral spring 54 is rotationally entrained by the driveshaft and serves as a conveyor worm assisting the traverse of the grain feed from the supply channel 48 towards the milling gap.

Figure 2:
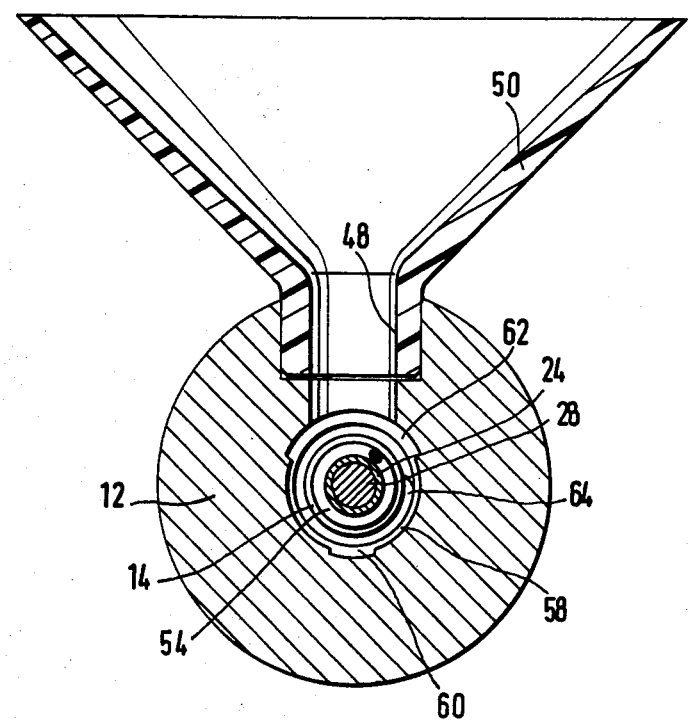

An annular transition port 58 is formed in the millstones 12 and 14, adjacent to the chamber 52, and terminates at the conically expanding milling surfaces 46. As may be seen in the sectional view of FIG. 2, this annular port 58 is radially expanded in a region 62 overlying the driveshaft segment 28, while below the segment 28 it is provided with an axially aligned groove 60. The radial expansion region 62 and the groove 60 cooperate with a spiral groove 64 at the periphery of the rotating millstone 14, so as to ensure a uniformly metered transport of grain kernels into the milling gap between the abrasive surfaces 46.

When required, a cap may be slipped onto the front end of the stationary millstone 12, encompassing the rotating millstone, the adjusting nut 42 and the jamnut 44; a downwardly facing opening is provided in the cap for the discharge of flour from the milling apparatus.

I claim:

1. An improved cereal mill apparatus with stationary and rotating millstones formed as coaxial bodies of revolution, with a driveshaft of the rotating millstone passing through a central orifice within the stationary millstone, the rotating millstone being mounted on said driveshaft for rotational entrainment, and with a supply funnel in communication with a milling gap defined between said stationary and rotating millstones, wherein:
   said stationary millstone serves as an external housing and a support for the cereal mill apparatus;
   said driveshaft is rotatably mounted in bearing means affixed within said stationary millstone; and
   said supply funnel is socketed in an upper surface of said stationary millstone and communicates with said milling gap through a supply channel radially piercing said stationary millstone.

2. The cereal mill apparatus of claim 1, additionally comprising coupling flange means affixed in said stationary millstone at an external surface remote from said rotating millstone and substantially orthogonal to said driveshaft.

3. The cereal mill apparatus of claim 2, wherein said coupling flange means engage mating coupler means made integral with a kitchen machine drive; and a segment of said driveshaft extending beyond said external surface of said stationary millstone is configured to engage a drive clutch in said kitchen machine drive.

4. The cereal mill apparatus of claim 2, wherein said coupling flange means engage the casing of an electric motor; and wherein said driveshaft is rotationally engaged in the output of a transmission driven by said electric motor.

5. The cereal mill apparatus of claim 4, wherein an output shaft of said electric motor is aligned vertically; and wherein a casing of said electric motor supports the stationary millstone.

6. The cereal mill apparatus of claim 2, wherein said coupling flange means engage a vertically aligned stand for support of the stationary millstone; wherein a portion of said driveshaft extends through and beyond an orifice in said stand; and wherein handcrank means engage said portion of the driveshaft extending beyond said orifice.

7. The cereal mill apparatus of claim 1, wherein said milling gap is defined by conically expanding abrading surfaces of said stationary and rotating millstones, the abrading surface of said stationary millstone being formed as a funnel; and wherein said supply channel terminates along said driveshaft in a position proximate to the apex of said funnel.

8. The cereal mill apparatus of claim 1, wherein said bearing means include at least one bushing, with a sintered metallic matrix, engaged in said stationary millstone as a casting insert.

9. The cereal mill apparatus of claim 1, wherein said driveshaft is provided with a radially extending collar proximate to a radially extending surface in said bearing means for coacting therewith as a thrust bearing.

10. The cereal mill apparatus of claim 1, wherein said rotating millstone is axially reciprocable along said driveshaft; wherein said driveshaft is provided with a threaded portion at its end extending beyond said rotating millstone; and wherein adjusting nut means, including a jamnut, are engaged upon said threaded portion for the adjustment of said milling gap defined between said stationary millstone and said axially reciprocable millstone.

11. The cereal mill apparatus of claim 1, wherein said driveshaft is constructed as an assembly of three axially adjoining segments, comprising a central segment rotatably engaged in said bearing means; a drive segment secured by threaded fastening means in said central segment, extending from a face of said stationary millstone remote from said rotating millstone, and engaging an external drive means; and a cantilevered segment secured by threaded fastening means in said central segment, and slideably engaging said rotating millstone with no relative angular motion.

12. The cereal mill apparatus of claim 1, additionally comprising conveying means, comprising a spiral spring surrounding and affixed to said driveshaft in a region below said supply channel.

13. The cereal mill apparatus of claim 1, wherein a cap enclosure is affixed to said stationary millstone, thereby enveloping said rotating millstone and an outlet of said milling gap; wherein said cap enclosure is provided with a downward opening orifice for the discharge of milled cereal.

* * * * *